(12) United States Patent
Aoki et al.

(10) Patent No.: US 7,319,800 B2
(45) Date of Patent: Jan. 15, 2008

(54) OPTICAL WAVEGUIDE DEVICE

(75) Inventors: Kenji Aoki, Ichinomiya (JP); Jungo Kondo, Nishikamo-Gun (JP); Atsuo Kondo, Okazaki (JP); Osamu Mitomi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/560,144

(22) Filed: Nov. 15, 2006

(65) Prior Publication Data

US 2007/0081766 A1 Apr. 12, 2007

Related U.S. Application Data

(63) Continuation of application No. PCT/JP2005/007942, filed on Apr. 20, 2005.

(30) Foreign Application Priority Data

May 18, 2004 (JP) ............... 2004-147149

(51) Int. Cl.
G02F 1/035 (2006.01)
(52) U.S. Cl. ....................................... 385/2
(58) Field of Classification Search ............ 385/2, 385/8
See application file for complete search history.

(56) References Cited

U.S. PATENT DOCUMENTS

| 5,416,859 | A * | 5/1995 | Burns et al. ............... 385/3 |
| 6,052,496 | A * | 4/2000 | O'Donnell ................. 385/3 |
| 6,219,469 | B1 | 4/2001 | Minakata et al. |
| 6,411,747 | B2 | 6/2002 | Rangarj |
| 6,449,080 | B1 | 9/2002 | McBrien et al. |
| 6,556,727 | B2 | 4/2003 | Minakata et al. |
| 6,734,755 | B2 | 5/2004 | Cites et al. |

| 2001/0008569 | A1 | 7/2001 | Rangary |
| 2003/0214364 | A1 | 11/2003 | Cites et al. |

FOREIGN PATENT DOCUMENTS

| JP | 06-130338 A1 | 5/1994 |
| JP | 07-064031 A1 | 3/1995 |

(Continued)

Primary Examiner—Michelle Connelly-Cushwa
Assistant Examiner—Chris H. Chu
(74) Attorney, Agent, or Firm—Burr & Brown

(57) ABSTRACT

A voltage is applied on a first branch 3a by a first ground electrode 10 and a signal electrode 11, and a voltage is applied on a second branch 3b by a second ground electrode 12A and the signal electrode 11. A first gap 13 is formed between the first ground electrode 10 and the signal electrode 11, and a second gap 14 is formed between the second ground electrode 12A and the signal electrode 11. The first gap 13 and the second gap 14 are divided into voltage applying portions 13a, 14a, feed-through portions and connection portions 13b, 14b therebetween, respectively, and satisfy the formula: $G_{12}/G_{11} \leq G_{22}/G_{21} < G_{32}/G_{31}$. $G_{11}$ represents a width of the first gap 13 at the connection portion 13b, $G_{12}$ represents a width of the second gap 14 at the connection portion 14b, $G_{21}$ represents a width of the first gap 13 at an end 13c on the connection portion side, $G_{22}$ represents a width of the second gap 14 at an end 14c on the connection portion side 14c, $G_{31}$ represents a width of the first gap 13 at the voltage applying portion 13a, and $G_{32}$ represents a width of the second gap 14 at the voltage applying portion 14a.

5 Claims, 13 Drawing Sheets

FOREIGN PATENT DOCUMENTS

| | | |
|---|---|---|
| JP | 10-133159 A1 | 5/1998 |
| JP | 11-505337 A1 | 5/1999 |
| JP | 11-295674 A1 | 10/1999 |
| JP | 2001-290115 A1 | 10/2001 |
| JP | 2002-169133 A1 | 6/2002 |
| JP | 2004-007682 A1 | 1/2004 |
| JP | 2004-318113 A1 | 11/2004 |

\* cited by examiner

OPTICAL WAVEGUIDE DEVICE

BACKGROUND OF THE INVENTION

1. Field of the Invention

The present invention relates to an optical waveguide device such as a traveling wave optical modulator.

2. Background Arts

The present applicant has disclosed a configuration where a thin portion is provided under optical waveguides of a substrate of a traveling wave optical modulator, and the thickness of the thin portion is equal to or less than 10 μm, for example, in Japanese Laid-Open Patent Publication (Kokai) No. H10-133159A and Japanese Laid-Open Patent Publication (Kokai) No. 2002-169133A. With this configuration, optical modulation can be advantageously carried out at a high speed without forming a buffer layer made of silicon oxide while a product (Vπ·L) of a drive voltage Vπ and the length L of electrodes can be reduced.

SUMMARY OF THE INVENTION

According to the traveling wave optical modulator as disclosed in Japanese Laid-Open Patent Publication (Kokai) No. H10-133159A and Japanese Laid-Open Patent Publication (Kokai) No. 2002-169133A. CPW (coplanar waveguide) electrodes and a Mach-Zehnder type optical waveguide are formed on an X plate made of single crystal of lithium niobate. The same electric field is applied on respective branches of the optical waveguide, and an electrode interaction length is increased, thereby providing an optical modulator with a zero-chirp characteristic, for example.

However, in practical optical transmission systems, it is advantageous that an optical modulator using an X plate and a Y plate as substrates has a predetermined chirp value. For example, it has not been studied to cause an optical modulator using X and Y plates of electro-optical crystals as substrates to have such a predetermined chirp value.

The present applicant came across an idea to make a pair of gaps different in the widths from each other thereby causing an optical modulator to have a predetermined amount of chirp, as described later. However, in this case, it turned out that an electrode pattern abruptly changes from an approximately symmetrical shape to an asymmetrical shape at a border (bent portion of signal electrode) between a feed-through portion and a voltage applying portions of the modulator. A reflection thus occurs, resulting in generation of ripples on a high frequency transmission characteristic ($S_{21}$ characteristic) of the electrode.

An object of the present invention is to restrain ripples on the high frequency transmission characteristic ($S_{21}$ characteristic) and to shift the frequency where the ripples occur to the higher frequency, in an optical waveguide device having a first gap and a second gap different in widths from each other.

An optical waveguide device according to the present invention includes a substrate comprising an electro-optical material, an optical waveguide formed in or on the substrate and including at least a first branch and a second branch, a signal electrode, a first ground electrode and a second ground electrode. A voltage is applied on the first branch by means of the first ground electrode and the signal electrode, and a voltage is applied on the second branch by means of the second ground electrode and the signal electrode. A first gap is formed between the first ground electrode and the signal electrode, and a second gap is formed between the second ground electrode and the signal electrode.

According to the present invention, the first gap and the second gap are respectively divided into a voltage applying portion, a feed-through portion and a connection portion therebetween, and the first gap and the second gap satisfy (refer to FIG. 4):

$$G_{12}/G_{11} \leq G_{22}/G_{21} < G_{32}/G_{31}$$

where $G_{11}$ is a width of the first gap 13 at the connection portion 13b, $G_{12}$ is a width of the second gap 14 at the connection portion 14c, $G_{21}$ is a width of the first gap 13 at an end 13c on the connection portion side of the voltage applying portion 13a, $G_{22}$ is a width of the second gap 14 at an end 14c on the connection portion side of the voltage applying portion 14a, $G_{31}$ is a width of the first gap 13 at the voltage applying portion 13a, and $G_{32}$ is the width of the second gap 14 at the voltage applying portion 14a.

The width $G_{21}$ of the first gap 13 and the width $G_{22}$ of the second gap 14 are made largely different from each other in the voltage applying portion in order to provide a chirp modulation characteristic as shown in FIG. 3. It was found out that there are generated ripples (ripples of 15 GHz or lower) on the $S_{21}$ characteristic as shown in FIG. 12. These ripples on the $S_{21}$ characteristics are caused by a large change in electric field mode distribution of microwave, around the connection portions (bent portions) 13b and 14b of the voltage applying portions to the feed-through portions, respectively.

Based on this finding, the inventors made such adjustment that a ratio of the gap width $G_{22}$ to the gap width $G_{21}$ ($G_{22}/G_{21}$) at the end portions 13c and 14c of the voltage applying portions 13a and 14a is between a gap width ratio ($G_{12}/G_{11}$) at the connection portions (bent portions) 13b and 14b and a gap width ratio ($G_{32}/G_{31}$) at the voltage applying portions 13a and 14a, as shown in FIG. 4. As a result, the inventors successfully smoothed the change in the electric field mode distribution of microwave around the connection portions (bent portions) 13b and 14b of the voltage applying portions to the feed-through portions, respectively. The ripples on the $S_{21}$ characteristic can be successfully shifted to the higher frequency range as shown in FIG. 13, resulting in devising the present invention.

BEST MODES FOR CARRYING OUT THE INVENTION

A detailed description will now be given of the present invention with reference to drawings.

Figure 1:
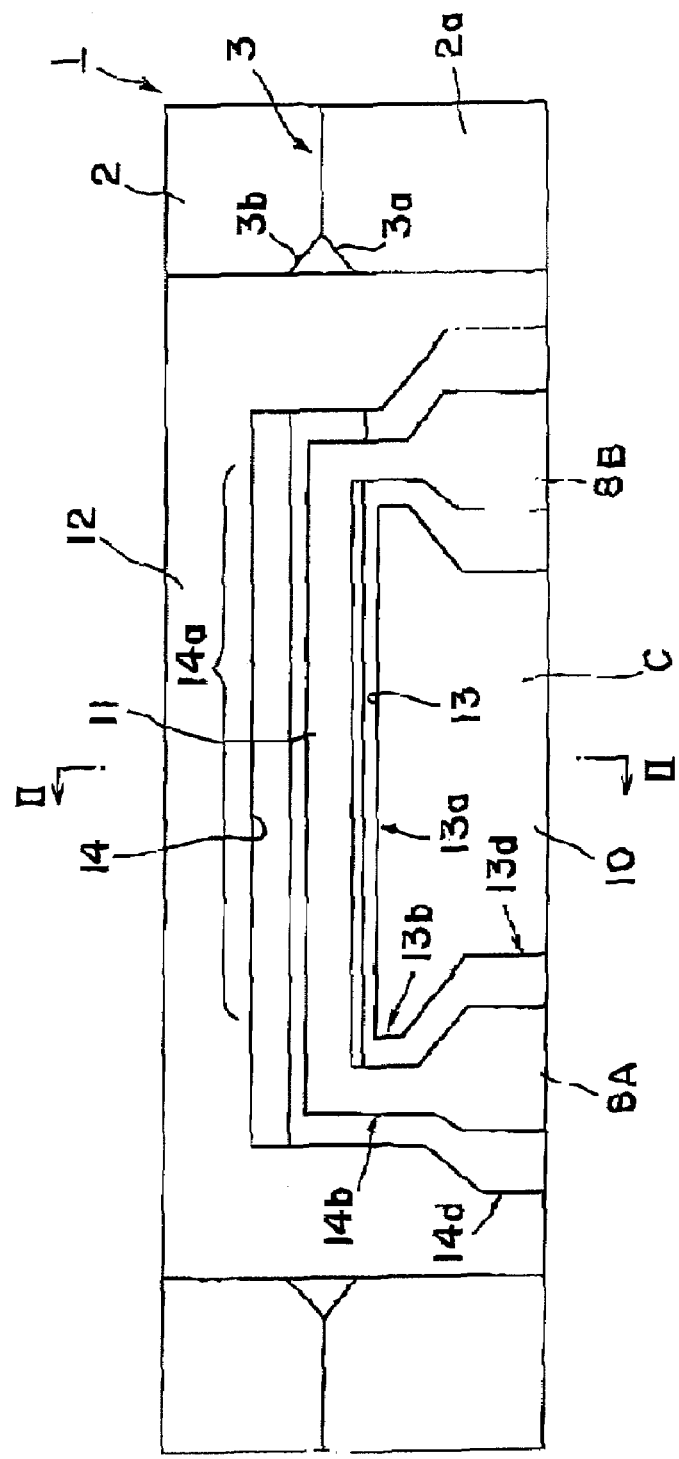
FIG. 1 is a plan view schematically showing an example of an optical waveguide device according to the present invention.
Figure 2:
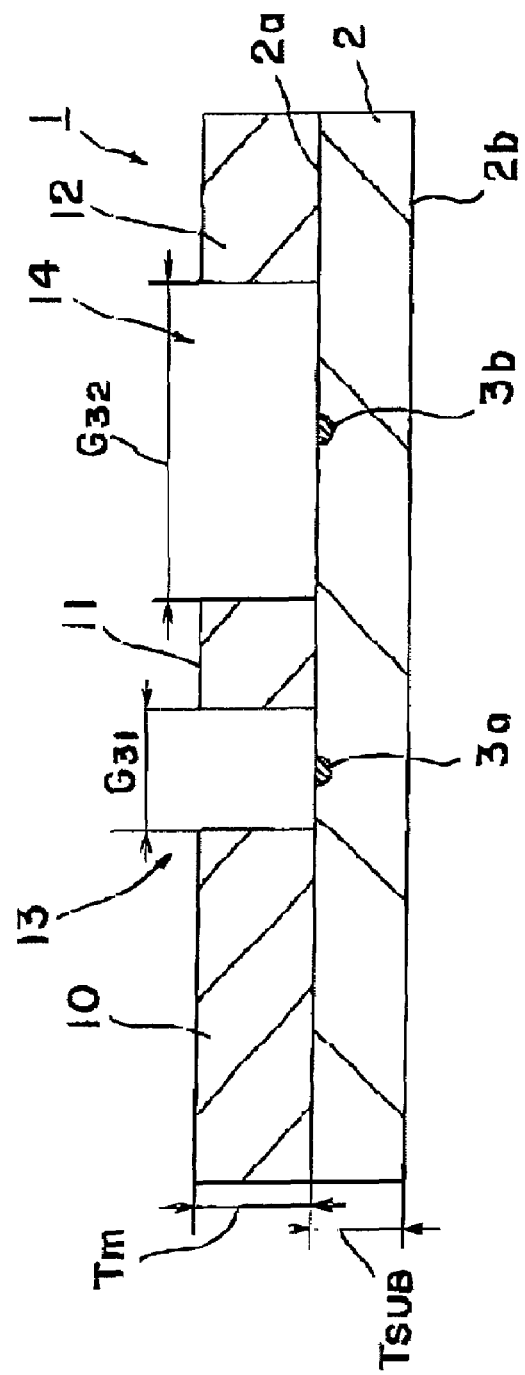
FIG. 2 is a cross sectional view of the device along the line II-II in FIG. 1.

FIG. 1 is a cross sectional view schematically showing an entire optical modulator 1 according to the present invention. FIG. 2 is a cross sectional view of the device along the line II-II in FIG. 1.

The optical modulator 1 includes a substrate 2 in a flat plate shape, for example. An optical waveguide 3 is provided on a main surface 2a side of the substrate 2, and the optical waveguide 3 includes a first branch 3a and a second branch 3b. Moreover, on the main surface 2a are provided a coplanar type signal electrode 11, a first ground electrode 10, and a second ground electrode 12. The first branch 3a is disposed in a first gap 13, and the second branch 3b is disposed in a second gap 14.

Though the present example employs so-called coplanar waveguide (CPW) electrode arrangement, the arrangement of the electrodes is not specifically limited. The present invention can also be applied to so-called asymmetric coplanar strip line (A-CPS) electrode arrangement.

According to the present example, the branches 3a and 3b of the optical waveguide are respectively formed in the first gap 13 and the second gap 14, and a signal voltage is approximately horizontally applied on the respective branches 3a and 3b. The optical waveguide 3 constitutes so-called Mach-Zehnder type optical waveguide as observed in a plan view.

The first gap 13 includes a voltage applying portion 13a, a feed-through portion 13d, and a connection portion 13b between 13a and 13d. An intermediate part between the connection portion 13b and the voltage applying portion 13a are bent at a right angle, for example. Moreover, the second gap 14 includes a voltage applying portion 14a, a feed-through portion 14d, and a connection portion 14b between 14a and 14d. An intermediate part between the connection portion 14b and the voltage applying portion 14a is bent at a right angle, for example.

With this design, an electric field intensity $E_x$ applied on the branch 3a becomes relatively larger at the voltage applying portion 13a, which has a relatively narrow width $G_{31}$. An integral in terms of an electrode interaction length of the electric field intensity thus becomes larger. An electric field intensity applied on the branch 3b becomes relatively small at the voltage applying portion 14a, which has a relatively large width $G_{32}$. As a result, the chirp value of the optical modulator 1 can be adjusted to a desired value.

In order to increase the chirp value of an optical modulator, the difference between $G_{31}$ and $G_{32}$ is preferably equal to or more than 3 μm, and more preferably equal to or more than 20 μm. In order to restrain the overall VπL to a small value, $G_{31}$ is preferably equal to or less than 100 μm, and more preferably equal to or less than 40 μm. In order to prevent the signal electrode and the ground electrodes from coming in electrical contact with each other, $G_{31}$ and $G_{32}$ are preferably equal to or more than 1 μm, and more preferably equal to or more than 3 μm. $G_{32}/G_{31}$ is preferably equal to or more than 1.5, and more preferably equal to or more than 3. However, a desired chirp value depends on an optical communication system to which an optical modulator is applied, and the application is still possible beyond these ranges.

A description will now be given of the chirp value. The amount of chirp is also referred to as "chirp parameter α".

Respective integrals $A_1$ and $A_2$ of the electric field intensity $E_x(Z)$ in terms of the interaction length "z" of the electrodes are calculated for the two branches (optical waveguides) 3a and 3b of an optical modulator. The electrode interaction length of the electric field intensity at the branch is a value obtained by integrating the electric field intensity $E_x(Z)$ at respective points "z" in the branch along the overall length L of the branch. This integral is given by:

$$\int_0^L E_x(z)\,dz$$

According to Japanese Laid-Open Patent Publication (Kokai) No. H07-064031, for example, a parameter α which represents the chirp is represented as:

$$\alpha = -\cot(\Delta\beta L) \cdot \frac{1+m}{1-m}$$

$$m = \frac{\Delta n_1}{\Delta n_2}$$

$$\Delta\beta = \frac{\beta_1 - \beta_2}{2}$$

where $\Delta\beta L$ is usually $\pi/\Delta$ or $-\pi/4$, and thus, $\cot(\Delta\beta L)$ is 1 or $-1$. $\Delta n_1$ and $\Delta n_2$ respectively represent changes in refractory index in the waveguides 3a and 3b. Average changes in refractory index are proportional to:

$$\int_0^L E_x(z)\,dz$$

There thus holds:

$$m = \frac{\Delta n_1}{\Delta n_2} = \frac{A_1}{A_2}$$

On the signal electrode of the device 1 are provided a pair of feed-through portions 8A and 8B for electrical connections to a housing. At the respective feed-through portions, the respective ground electrodes and the signal electrode are connected to external connector pins. The characteristic impedance of the connector pins is prescribed to a predetermined value such as 50 Ω, and it is thus necessary to standardize the characteristic impedance of the electrodes at the respective feed-through portions to a predetermined value. For this purpose, the widths of the feed-through portions 8A and 8B of the center electrode are increased, and the feed-through portions 13d and 14d of the gaps are enlarged.

Figure 3:
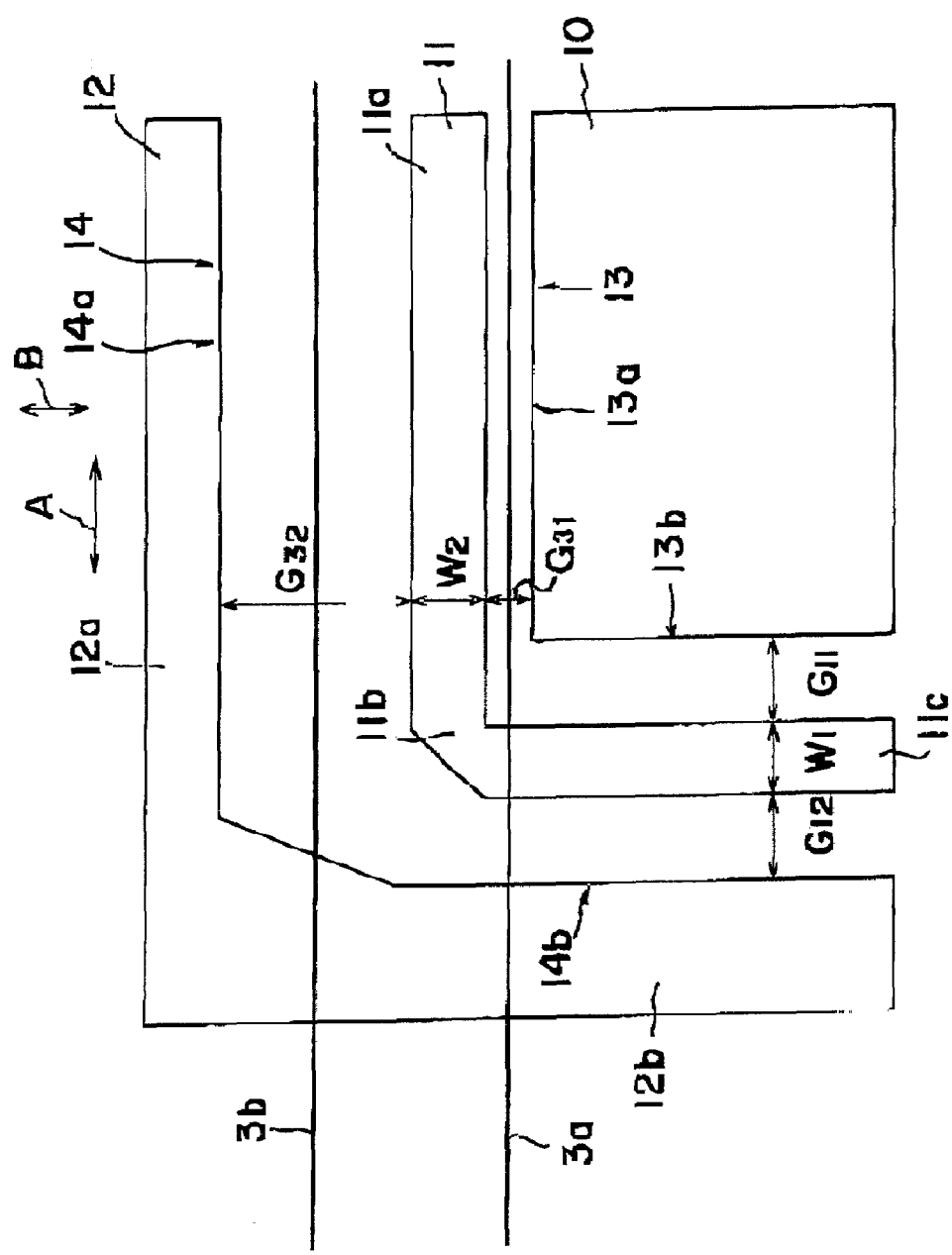
FIG. 3 is a plan view showing a pattern of electrodes and gaps of a comparative example.
Figure 12:
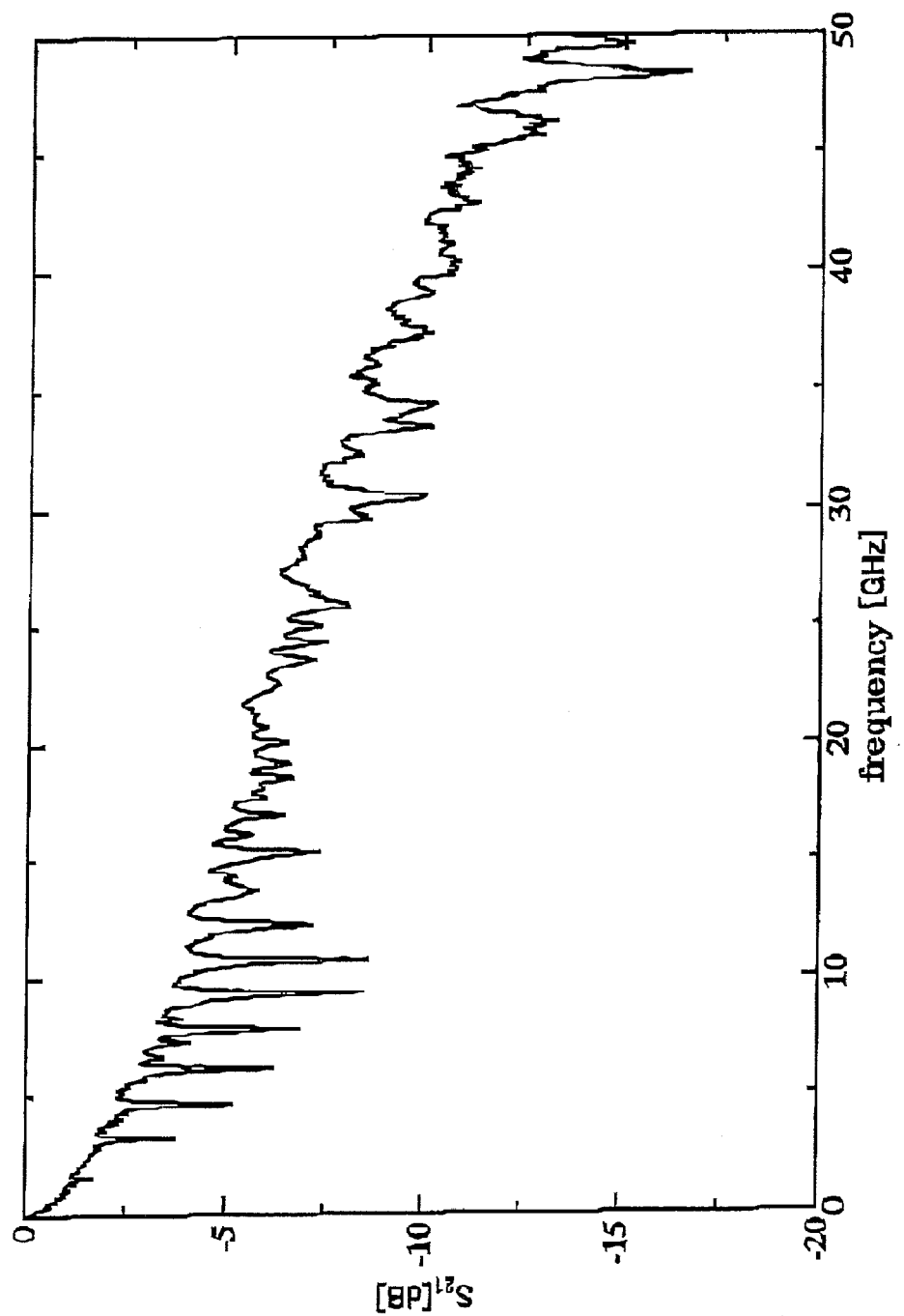
FIG. 12 is a chart showing the $S_{21}$ characteristic of the device in FIG. 3.

On this occasion, if the width $G_{31}$ of the first gap 13 at the voltage applying portion 13a and the width $G_{32}$ of the second gap 14 at the voltage applying portion 14a are made largely different from each other in order to provide a chirp modulation characteristic as shown in FIG. 3, ripples are generated on the $S_{21}$ characteristic as shown in FIG. 12. This is caused by a large change in the electric field mode distribution of microwave around the connection portions (bent portions) 13b and 14b from the voltage applying portions 13a and 14a to the feed-through portions 13d and 14d, respectively.

Figure 4:
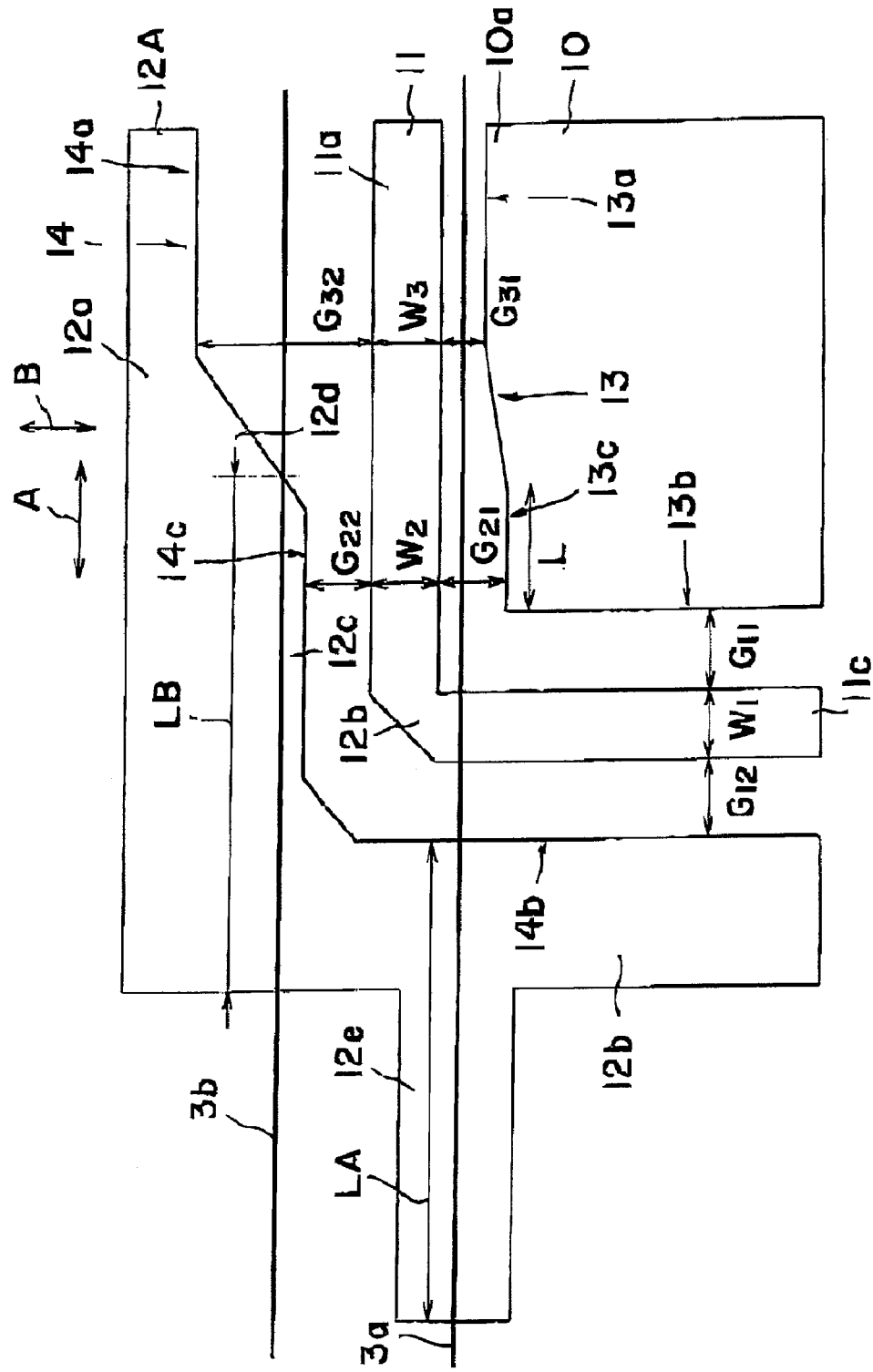
FIG. 4 is a plan view showing a pattern of electrodes and gaps according to an example of the present invention.

FIG. 4 is a plan view showing an electrode pattern according to an embodiment of the present invention.

The electrode pattern according to the present example satisfies a relationship:

$$G_{12}/G_{11} \leq G_{22}/G_{21} < G_{32}/G_{31}$$

Namely, a ratio of the gap width $G_{22}$ to the gap width $G_{21}$ at the end portions 14c and 13c of the voltage applying portions 14a and 13a ($G_{22}/G_{21}$) is set to be equal to or more than a gap width ratio ($G_{12}/G_{11}$) at the connection portions 14b and 13b. At the same time, the gap width ratio ($G_{22}/G_{21}$) at the end portions 14c and 13c is adjusted to be less than the gap width ratio ($G_{32}/G_{31}$) at the voltage applying portions 14a and 13a. As a result, the change in electric field mode distribution of microwave can be smoothed around the connection portions (bent portions) 13b and 14b from the voltage applying portions to the feed-through portions, thereby shifting these ripples on the $S_{21}$ characteristic to the higher frequency range.

In order to form such a gap pattern, according to the present example, there is provided a more or less protruded portion 10a in the voltage applying portion of the first ground electrode 10. The center signal electrode 11 includes a straight portion 11a (A direction) and a straight portion 11c (B direction), which intersect approximately orthogonally with each other, and a bent portion 11b which connects the straight portions 11a and 11c. The second ground electrode 12A includes a straight portion 12a which extends in the voltage applying direction A, and a feed-through portion 12b which intersects approximately orthogonally with the straight portion 12a. A wide protruded portion 12c and a tapered portion 12d are formed at an end portion of the voltage applying portion. The gap widths of the respective portions are thereby adjusted.

According to the preferred embodiment of the present invention, a first branch is located in the first gap, and the second branch is located in the second gap as shown in FIG. 4, for example.

According to the present invention, the relationship: $G_{12}/G_{11} \leq G_{22}/G_{21}$ holds. $G_{22}/G_{21}$ may be equal to $G_{12}/G_{11}$. However, according to the present invention, $G_{22}/G_{21}$ is preferably equal to or less than five times of $G_{12}/G_{11}$, and more preferably equal to or less than three times of $G_{12}/G_{11}$.

Moreover, according to the present invention, the relationship $G_{22}/G_{21} < G_{32}/G_{31}$ holds. On this occasion, according to the present invention, $G_{32}/G_{31}$ is preferably equal to or more than 1.2 times of $G_{22}/G_{21}$, and more preferably equal to or more than two times of $G_{22}/G_{21}$. However, if $G_{32}/G_{31}$ is too large, it may cause ripples in a low frequency area. $G_{32}/G_{31}$ is thus preferably equal to or less than eight times of $G_{22}/G_{21}$, and more preferably equal to or less than five times of $G_{22}/G_{21}$.

According to the present invention, though $G_{12}/G_{11}$ is not specifically limited, the design of the feed-through portions is preferably symmetrical. $G_{12}/G_{11}$ is preferably equal to or less than three, and more preferably 1.

For a traveling wave optical modulator, the width of the center electrode is constant ($W_2=W_3$), and the $G_{21}$ and $G_{22}$ are determined so that the characteristic impedances of the voltage applying portions and the connection portions match each other. In order to do so, the width $G_{22}$ of the end portion 14c is needed to be narrower than the width $G_{32}$ of the voltage applying portion, as shown in FIG. 4. Therefore, on the second ground electrode 12A is needed to be formed the wide protruded portion 12c and the tapered portion 12d, for example.

As a result, depending on the design, the branch 3b of the optical waveguide would be located under the electrode 12A, as shown in FIG. 4. However the loss of light propagating in the waveguide tends to increase direct under the electrode, the optical loss of the branch 3b is different from that of the branch 3a, resulting in degraded characteristics such as extinction ratio and optical insertion loss. An electrode 12e for compensation may be provided for the branch 3a so that the length LB of the branch 3b direct under the electrode is made equal to the length LA of the branch 3a direct under the electrode. With this configuration, adjustment is preferably carried out such that the optical loss in the branch 3a is at the same level as the optical loss in the branch 3b.

If the branch 3b is located direct under the second ground electrode 12A in this way, the optical loss increases in the branch 3b. To prevent the loss, a protruded portion protruding toward the second ground electrode in the gap may be provided on the signal electrode.

Figure 5:
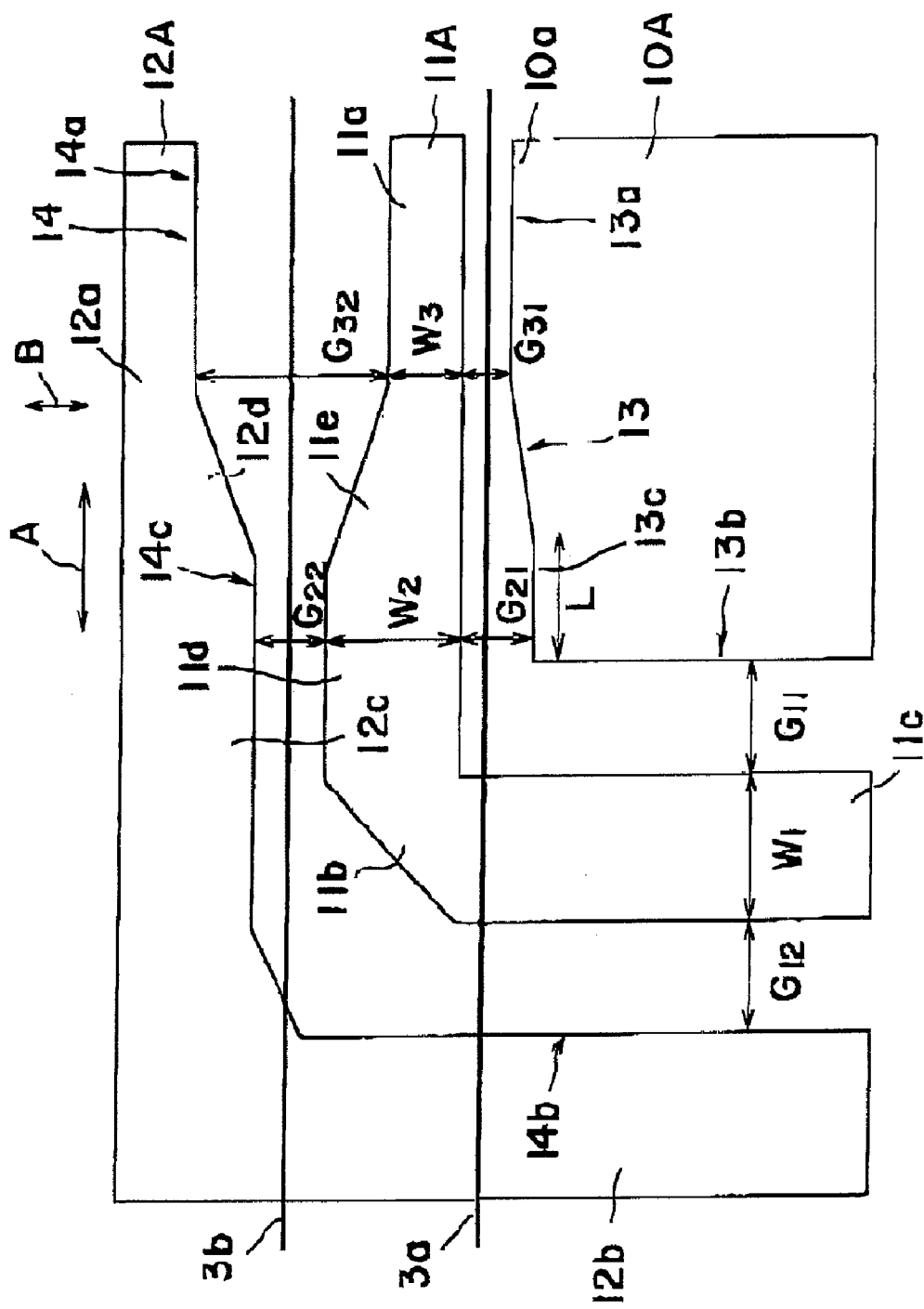
FIG. 5 is a plan view showing a pattern of electrodes and gaps according to another example of the present invention.

For example, the first ground electrode 10A in an example shown in FIG. 5 is similar to that shown in FIG. 4. A protruded portion 11d protruding toward the second ground electrode 12A is provided in the connection portion 14c of the signal electrode 11A. A tapered portion 11e is provided between the straight portion 11a and the protruded portion 11d. Accordingly, the protruded height of the protruded portion 12c on the second ground electrode 12A side can be reduced, resulting in a design where the branch 3b pass in the outside of the protruded portion 12c.

Figure 6:
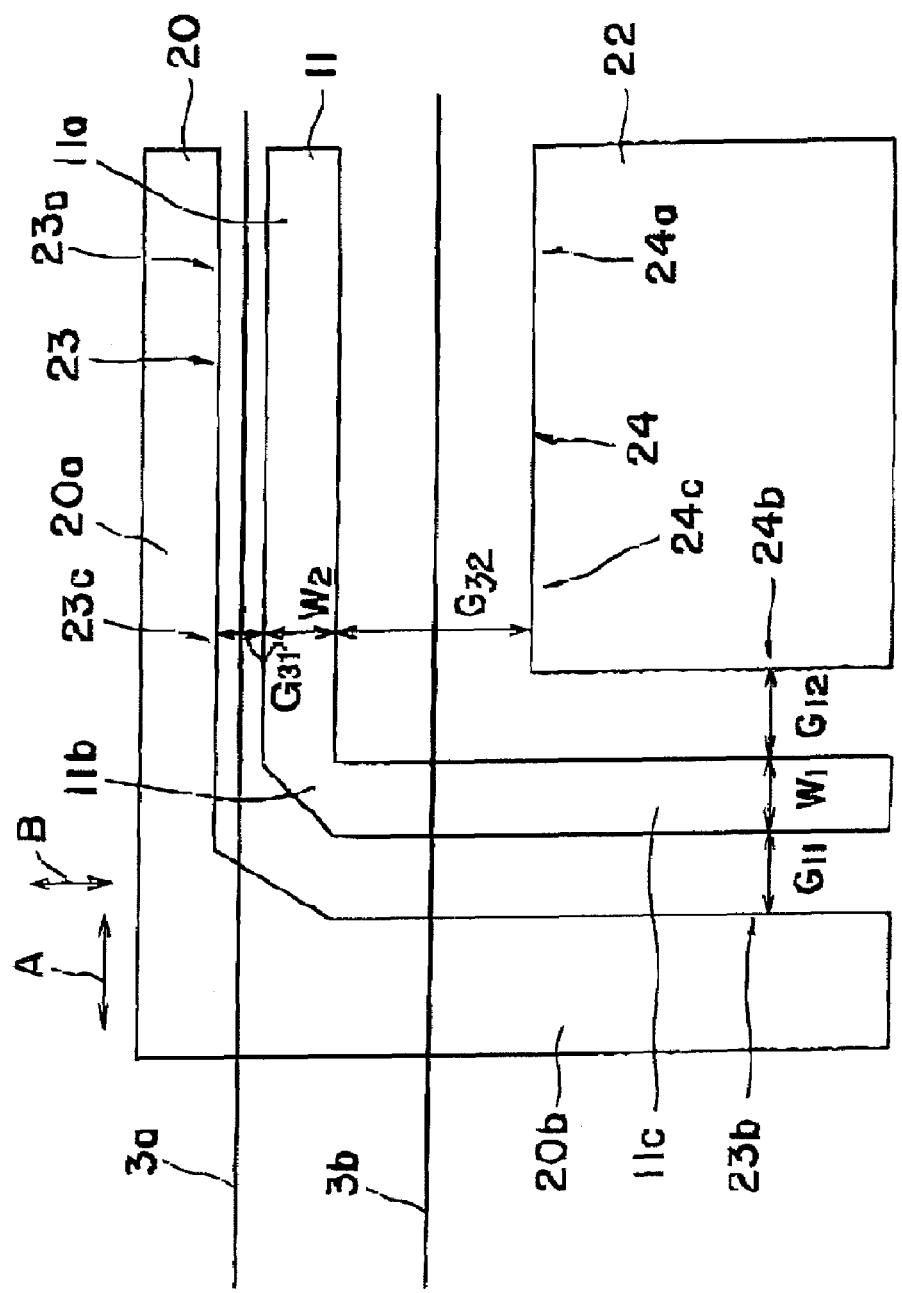
FIG. 6 is a plan view showing a pattern of electrodes and gaps of a comparative example.
Figure 7:
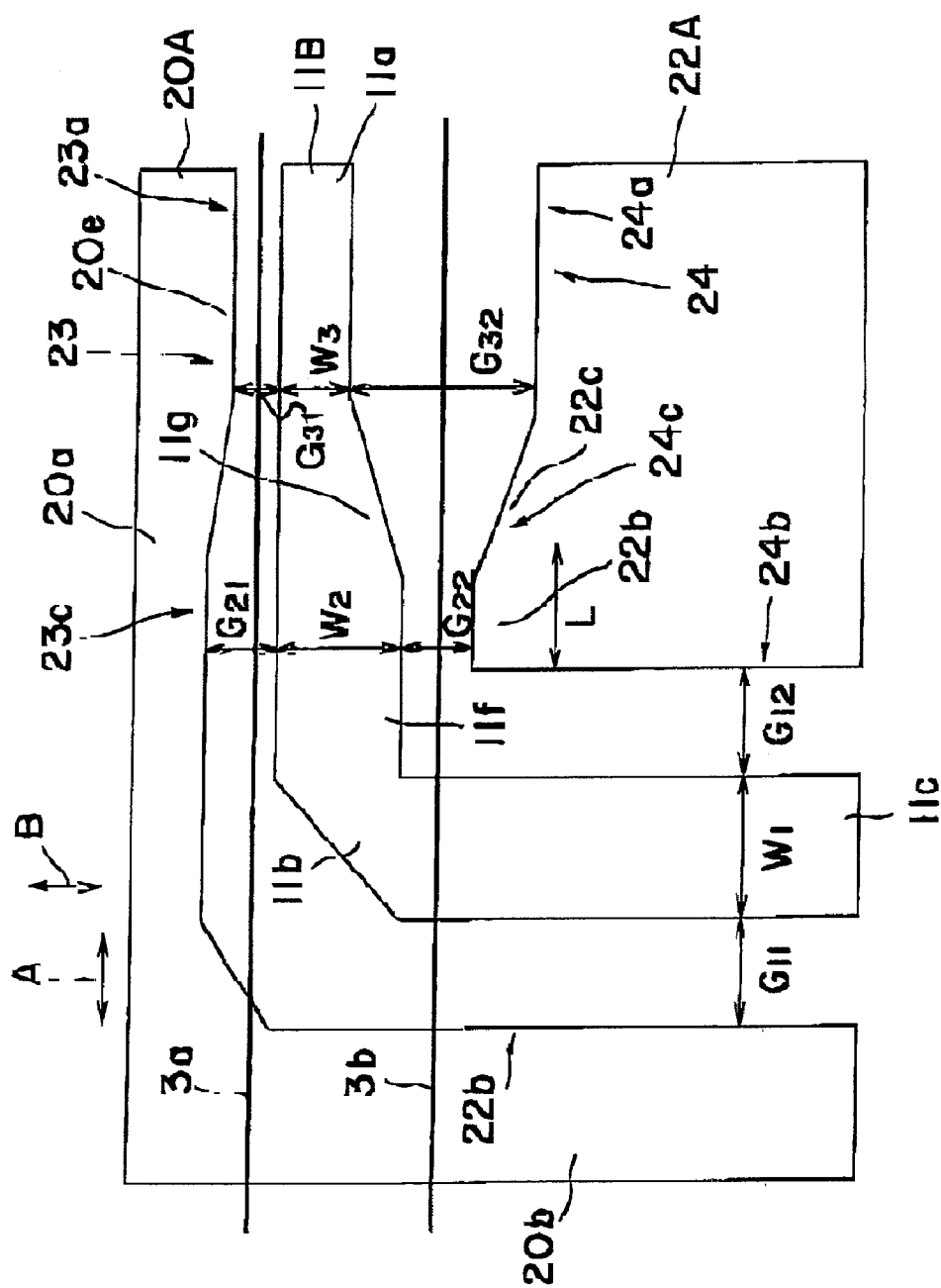
FIG. 7 is a plan view showing a pattern of electrodes and gaps according to a further example of the present invention.
Figure 8:
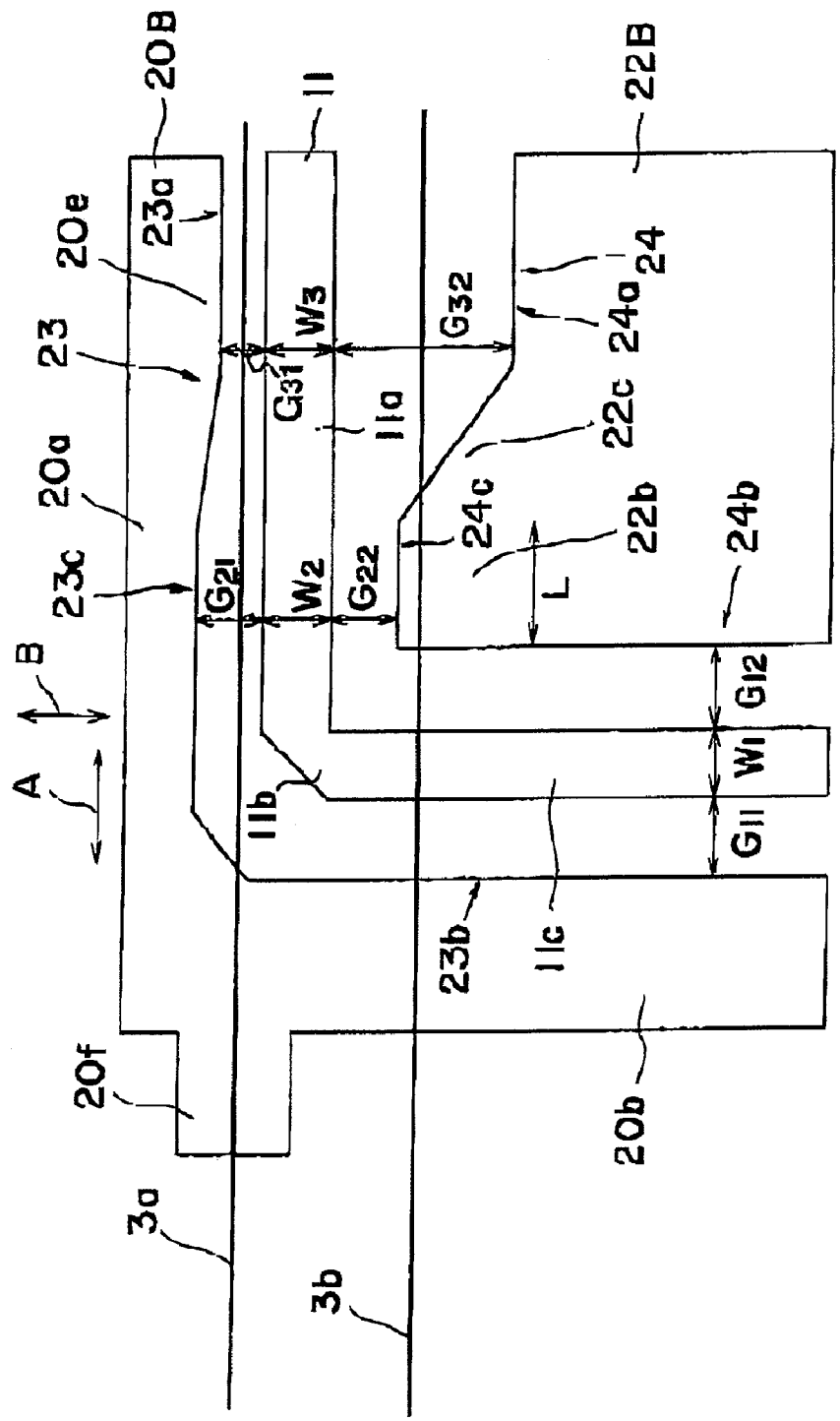
FIG. 8 is a plan view showing a pattern of electrodes and gaps according to still another example of the present invention.
Figure 9:
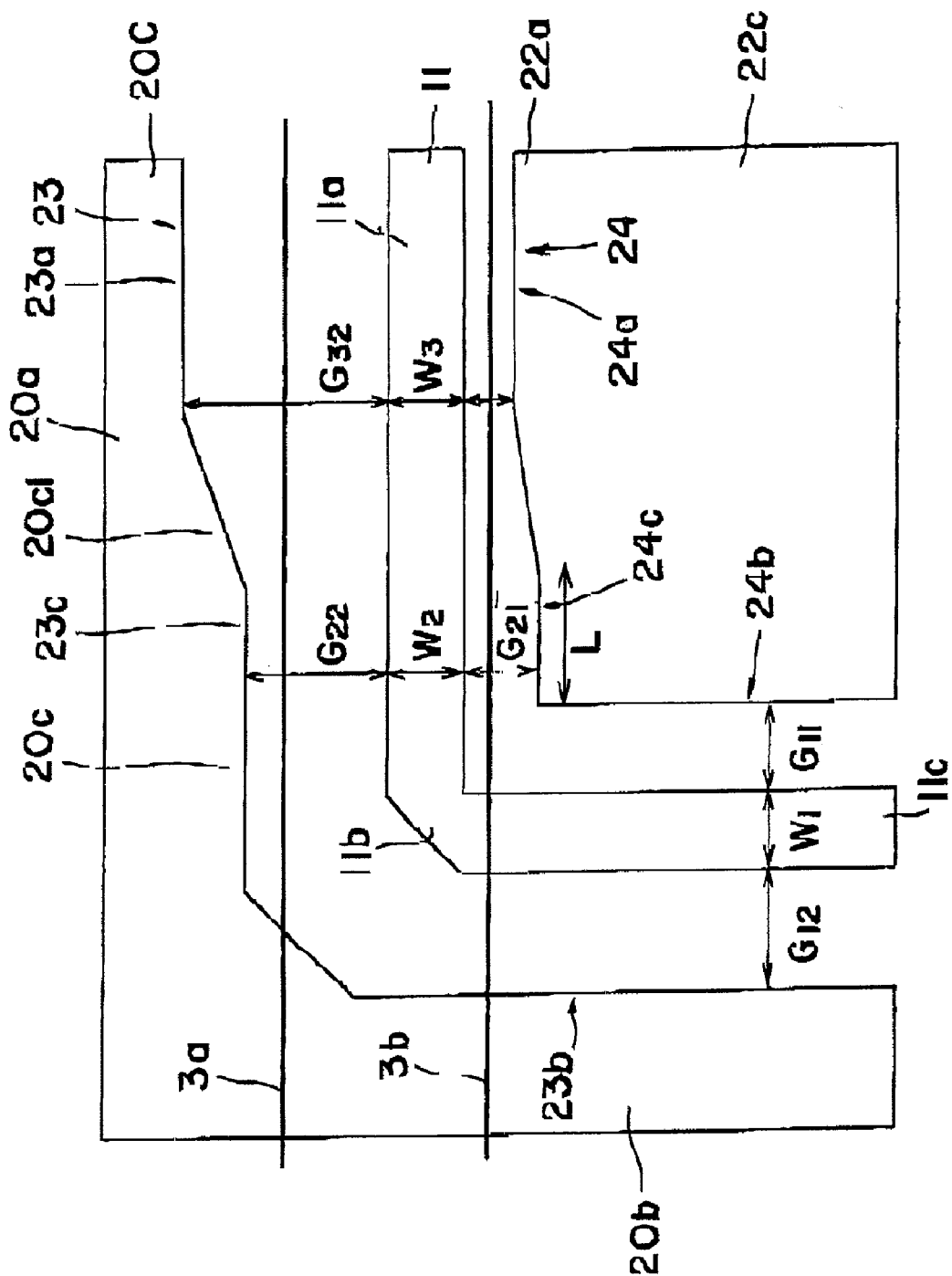
FIG. 9 is a plan view showing a pattern of electrodes and gaps according to yet another example of the present invention.

In the above respective examples, the electrode gap on the feed-through portion side of the device is made relatively small, and the electrode gap on the opposite side is made relatively large, compared with the example of FIG. 1. However, the electrode gap may be relatively large on the feed-through portion side of the device, the electrode gap may be relatively small on the opposite side, and the present invention may also be applied to this case. FIG. 6 is a reference example according to this form, and FIGS. 7 to 9 show examples according to this embodiment. In the respective examples in FIGS. 7 to 9, the second ground electrode (second gap) is located on the feed-through portion side, and the first ground electrode (first gap) is located on the side opposite to the feed-through portions.

In the reference example of FIG. 6, the signal electrode 11 is the same as that in FIG. 4. The first ground electrode 20 on the side opposite to the feed-through portion includes a straight portion 20a extending in the light traveling direction ("A" direction), and a straight portion 20b extending in the "B" direction orthogonal to the "A" direction. A second ground electrode 22 is provided on the feed-through portion side. A first gap 23 opposite to the feed-through portion includes a voltage applying portion 23a, the end portion 23c thereof, and a connection portion 23b. Moreover, a second gap 24 located on the feed-through portion side includes a voltage applying portion 24a, the end portion 24c and a connection portion 24b.

In the example shown in FIG. 6, to provide a chirp modulation characteristic, there is made a large difference between the width $G_{31}$ of the first gap 23 in the voltage applying portion 23a and the width $G_{32}$ of the second gap 24 in the voltage applying portion 24a.

In the example shown in FIG. 7, a signal electrode 11B includes the straight portion 11a extending in the light traveling direction "A", a thick protruded portion 11f and a tapered portion 11g located in the connection portion, the bent portion 11b, and the straight portion 11c extending in the direction of the arrow "B". A first ground electrode 20A includes the straight portion 20a extending in the direction of the arrow "A", a thick protruded portion 20e, and the straight portion 20b extending in the direction of the arrow "B". Moreover, a second ground electrode 22A includes a protruded portion 22b protruding toward the signal electrode 11B, and a tapered portion 22c in the connection portion.

The electrode pattern of the example shown in FIG. 7 satisfies the relationship:

$$G_{12}/G_{11} \leq G_{22}/G_{21} < G_{32}/G_{31}$$

Namely, the gap width ratio ($G_{22}/G_{21}$) at the end portions 23c and 24c of the voltage applying portions 23a and 24a are equal to or more than the gap width ratio ($G_{12}/G_{11}$) at the connection portions 23b and 24b, respectively. At the same time, the gap width ratio ($G_{22}/G_{21}$) at the end portions 23c and 24c is adjusted to be less than the gap width ratio ($G_{32}/G_{31}$) at the voltage applying portions 23a and 24a. As a result, the change in electric field made distribution of microwave is smoothed around the connection portions (bent portions) 23b and 24b from the voltage applying portions to the feed-through portions, thereby shifting the ripples on the $S_{21}$ characteristic to the higher frequency range.

Moreover, according to this example, the respective branches 3a and 3b are not formed under the electrodes, thereby preventing optical losses.

According to the example shown in FIG. 8, the signal electrode 11 includes the straight portion 11a extending in the light traveling direction "A", the bent portion 11b, and the straight portion 11c extending in the direction of the arrow "B". A first ground electrode 20B includes the straight portion 20a extending in the direction of the arrow "A", the thick protruded portion 20e, and the straight portion 20b extending in the direction of the arrow "B" as well as a protruded portion 20f for compensation. A second ground electrode 22B includes the protruded portion 22b protruding toward the signal electrode 11 and the taper portion 22c in the connection portion.

The electrode pattern of the example shown in FIG. 8 also satisfies the relationship $G_{12}/G_{11} \leq G_{22}/G_{21} < G_{32}/G_{31}$.

The second branch 3b passes direct under the protruded portion 22b, and the protruded portion 20f for compensation is thus provided on the second ground electrode 20B to cause the first branch 3b to pass under the protruded portion 20f thereby adjusting optical losses at the respective branches to be the same level.

According to the example shown in FIG. 9, the signal electrode 11 includes the straight portion 11a extending in the light traveling direction "A", the bent portion 11b, and the straight portion 11c extending in the direction of the arrow "B". A first ground electrode 20C includes the straight portion 20a extending in the direction of the arrow "A", the thick protruded portion 20c, a tapered portion 20d, and the straight portion 20b extending in the direction of the arrow "B". According to this example, the protruded portion 20c is provided in the connection portion 23c. A second ground electrode 22C includes a protruded portion 22a protruding toward the signal electrode 11. The protruded portion 22a is provided outside of the connection portion 24c. The electrode pattern of the example shown in FIG. 9 also satisfies the relationship: $G_{12}/G_{11} \leq G_{22}/G_{21} < G_{32}/G_{31}$.

According to the present invention, the ratio of the width $G_{22}$ of the second gap at the end on the connection portion side of the voltage applying portion to the width $G_{21}$ of the first gap at the end on the connection portion side: $G_{22}/G_{21}$ may be approximately constant. This example is shown in FIGS. 4 to 9, for example. However, $G_{22}/G_{21}$ is not necessarily approximately constant at the end of the voltage applying portion, and may vary. $G_{22}/G_{21}$ according to the present embodiment preferably smoothly increases toward the main portion of the voltage applying portion. While $G_{22}/G_{21}$ varies, the relationship: $G_{12}/G_{11} \leq G_{22}/G_{21} < G_{32}/G_{31}$ still holds.

Figure 10:
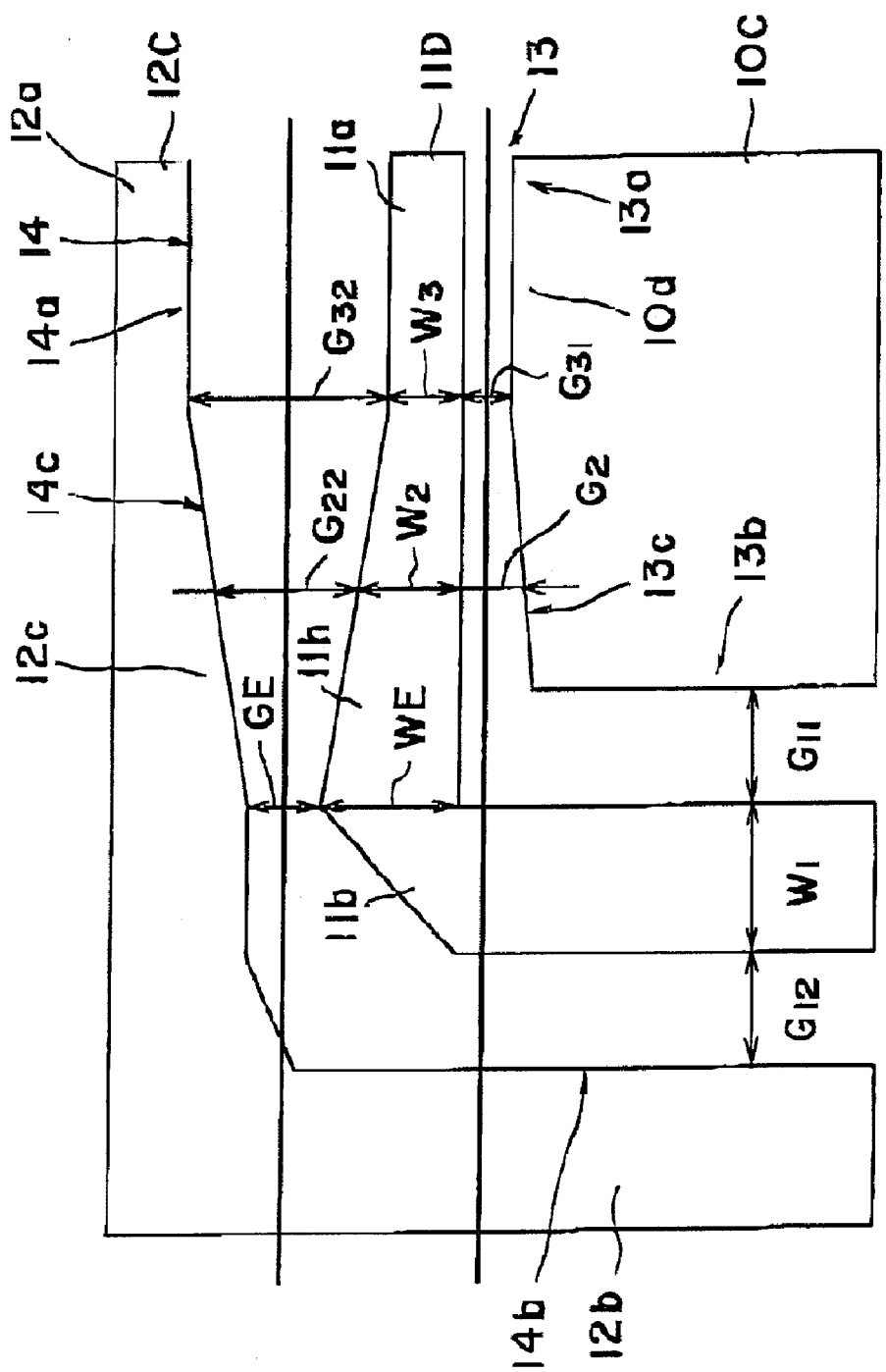
FIG. 10 is a plan view showing a pattern of electrodes and gaps according to still yet another example of the present invention.

For example, according to the example shown in FIG. 10, a more or less protruded portion 10d is provided on a first ground electrode 10C. A protruded portion 11h protruding toward a ground electrode 12C is formed on a signal electrode 11D, and the protruded portion 11h smoothly and linearly tapers. The protruded portion 12C is provided at the end of the voltage applying portion on the second ground electrode 12C. $G_{22}/G_{21}$ smoothly increases toward the center of the voltage applying portions 13a and 14a. While $G_{22}/G_{21}$ varies in this way, the relationship: $G_{12}/G_{11} \leq G_{22}/G_{21} < G_{32}/G_{31}$ still holds.

Moreover, according to the present invention, an intermediate portion may further be provided between the end on the connection portion side of the voltage applying portion and the main body portion of the voltage applying portion. The number of such intermediate portion is not specifically limited. However, still in this case, it is necessary that the relationship: $G_{12}/G_{11} \leq G_{22}/G_{21} < G_{32}/G_{31}$ holds according to the present invention. Then, it is provided that $G_{41}$ is the width of a first gap in the intermediate portion and $G_{42}$ is the width of a second gap in the intermediate portion. It is preferable that a relationship: $G_{22}/G_{21} \leq G_{42}/G_{41} < G_{32}/G_{31}$ holds in terms of the effects of the present invention.

Figure 11:
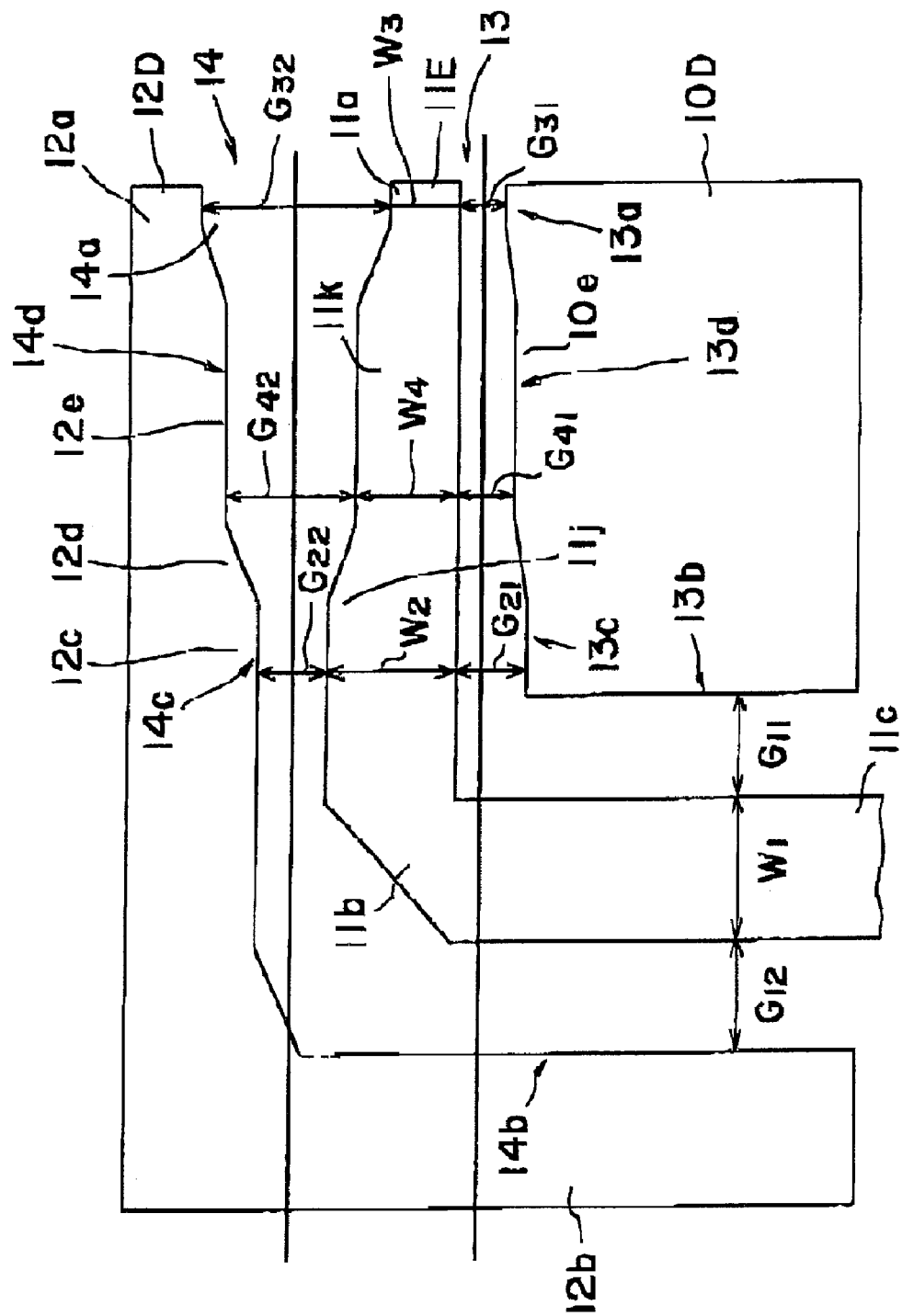
FIG. 11 is a plan view showing a pattern of electrodes and gaps according to even still yet another example of the present invention.

For example, according to the example shown in FIG. 11, a more or less protruded portion 10e is provided on a first ground electrode 10D. On a signal electrode 11E are formed protruded portions 11j and 11k protruding toward a ground electrode 12D, and the protruded portion 11j is higher than the protruded portion 11k. On the second ground electrode 12D are provided the protruded portions 12e and 12c and the tapered portion 12d between them at the end of the voltage applying portion. The protruded portion 12c is higher than the protruded portion 12e.

According to this example, in the gap 13 is provided an intermediate portion 13d in addition to the voltage applying portion 13a, the connection portion 13b and the end portion 13c, and in the gap 14 is provided an intermediate portion 14d in addition to the voltage applying portion 14a, the connection portion 14b and the end portion 14c. According to the present invention, the relationship:

$$G_{12}/G_{11} \leq G_{22}/G_{21} < G_{32}/G_{31}$$

holds. Further, it is provided that $G_{41}$ is the width of the first gap in the intermediate portion 13d and $G_{42}$ is the width of the second gap in the intermediate portion 14d, the relationship: $G_{22}/G_{21} \leq G_{42}/G_{41} < G_{32}/G_{31}$ holds.

The substrate constituting the optical waveguide substrate according to the present invention is made of a ferroelectric electro-optical material, preferably single crystals. There are no restrictions on these crystals as long as they can modulate light, and the crystals include lithium niobate, lithium tantalate, lithium niobate—lithium tantalate solid solution, potassium-lithium niobate, KTP, GaAs, and quartz crystal.

There are no restrictions on the material of the electrodes as long as it has a low resistance and is excellent in impedance characteristics. The electrodes may be made of materials such as gold, silver, and copper.

A buffer layer may be provided between the surface of the substrate and the signal electrode or ground electrodes. Publicly known materials such as silicon oxide, magnesium fluoride, silicon nitride and alumina may be used for the buffer layer.

The waveguide is formed on the substrate, and preferably on a main surface on one side of the substrate. The waveguide may be a ridge optical waveguide directly formed on one main surface of the substrate, a ridge optical waveguide formed via another layer on one main surface of the substrate, or an optical waveguide formed inside the substrate by the internal diffusion or ion exchange such as titanium diffused optical waveguide and proton exchange optical waveguide. The electrodes are provided on one main surface of the substrate, and may be directly formed on one main surface of the substrate or on the buffer layer.

In a preferred embodiment, the thickness of the substrate "Tsub" (refer to FIG. 2) is equal to or less than 200 μm, more preferably 100 μm. If a recessed portion is provided on the substrate, the thickness of the recessed portion may be equal to or less than 100 μm, preferably 50 μm, more preferably 30 μm.

The bottom surface of the substrate 2 may be bonded to an independent support base via a bonding layer. In terms of minimizing the influence of the support base on the propagation speed of the microwave, the material of the support base preferably has a dielectric constant lower than that of the electro-optical single crystal forming the substrate. Such a material includes glass such as quartz glass.

EXAMPLES

Comparative Example

The optical modulator 1 shown in FIGS. 1 to 3 was manufactured.

Specifically, the Mach-Zehnder optical waveguide 3 was formed on a surface of an X-cut three-inch wafer (LiNbO$_3$ single crystals) by means of titanium diffusion process and photolithography. The size of the optical waveguide can be 10 μm for l/e², for example.

The signal electrode and the ground electrodes were then formed by a plating process. A dummy substrate for polishing is fixed to a surface plate for polishing, and the substrate for the modulator is attached thereto while the electrode surface is facing down. The substrate for the modulator is then thinned to 8 μm by horizontal polishing, lapping, and polishing (CPM). The substrate is then fixed on the support base of flat plate shape. A resin film with a resin thickness of 50 μm is used as resin for the adhesion and fixing. End faces of the optical waveguide (portions to be connected to optical fibers) are polished, and respective chips are obtained by cutting the wafer by means of dicing. The width of the chip is set to 1.5 mm, and the overall thickness of the device is set to 0.6 mm.

On this occasion, the respective parameters are set as:

| | |
|---|---|
| Substrate thickness Tsub: | 8 μm |
| Electrode thickness Tm: | 25 μm |
| Electrode length: | 40 mm |
| $G_{11}$: | 45 μm |
| $G_{12}$: | 45 μm |
| $G_{31}$: | 20 μm |
| $G_{32}$: | 95 μm |
| $W_1$: | 30 μm |
| $W_2$: | 30 μm |

Single-core fiber arrays respectively holding a polarization maintaining optical fiber for 1.55 μm and a 1.3 μm single mode fiber were respectively produced. The former one and latter one were respectively connected to an input side and an output side of the optical modulator chip 1, respectively. The cores of the optical fibers and the optical waveguide were aligned, and the optical fibers and the substrate were adhered to each other by a ultraviolet curing resin.

The $S_{21}$ characteristic was then measured by a vector network analyzer. Used probes were Cascade CPW probes "ACP 50-250". FIG. 12 shows the result thereof. According to the results, a large number of ripples were observed in a frequency range below 15 GHz.

Example 1

An optical modulator shown in FIGS. 1, 2, and 4 was produced as the comparative example was. However the pattern of the electrodes and gaps was changed to that shown in FIG. 4, which is different from the comparative example. Moreover, the respective parameters were set as:

| | |
|---|---|
| Substrate thickness: | 8 μm |
| Electrode thickness: | 25 μm |
| Electrode length: | 40 mm |
| $G_{11}$: | 45 μm |
| $G_{12}$: | 45 μm |
| $G_{21}$: | 33 μm |
| $G_{22}$: | 33 μm |
| $G_{31}$: | 20 μm |
| $G_{32}$: | 95 μm |
| $W_1$: | 30 μm |
| $W_2$: | 30 μm |
| $W_3$: | 30 μm |
| Maximum taper angle of tapered portion 11 b: | 30° |

Figure 13:
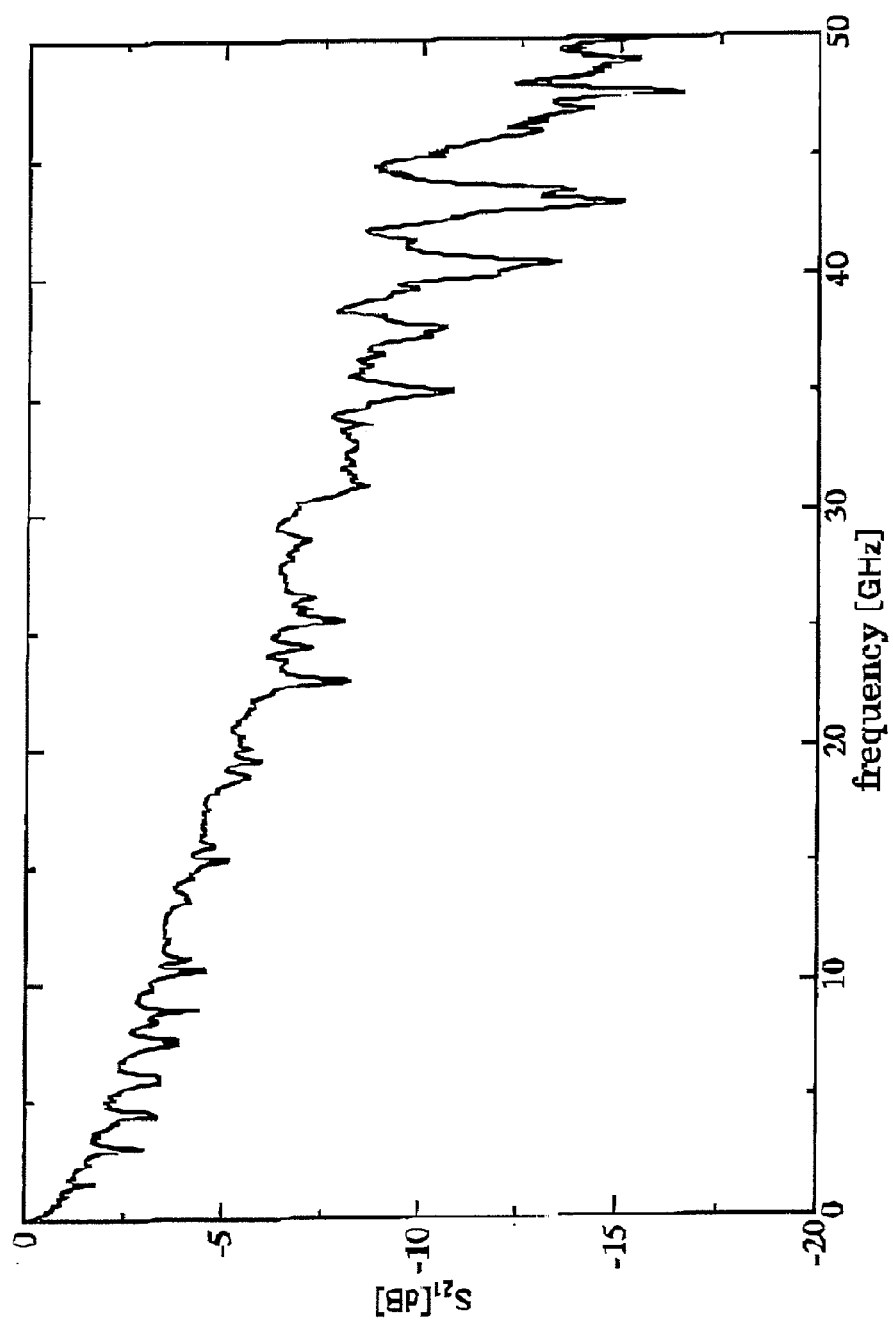
FIG. 13 is a chart showing the $S_{21}$ characteristic of the device in FIG. 4.

The $S_{21}$ characteristic of the modulator was measured as in the comparative example. FIG. 13 shows the measured results. It is apparent that the ripples observed in FIG. 12 were significantly reduced.

Example 2

An optical modulator shown in FIGS. 1, 2, and 5 was produced as the comparative example was. However the pattern of the electrodes and gaps was changed to that shown in FIG. 5, which is different from the comparative example. Moreover, the respective parameters were set as:

| | |
|---|---|
| Substrate thickness: | 8 μm |
| Electrode thickness: | 25 μm |
| Electrode length: | 40 mm |

-continued

| | |
|---|---|
| $G_{11}$: | 55 μm |
| $G_{12}$: | 55 μm |
| $G_{21}$: | 45 μm |
| $G_{22}$: | 45 μm |
| $G_{31}$: | 20 μm |
| $G_{32}$: | 95 μm |
| $W_1$: | 60 μm |
| $W_2$: | 60 μm |
| $W_3$: | 30 μm |
| Maximum taper angle of tapered portion 11 b: | 30° |

The $S_{21}$ characteristic of the modulator was measured as in the comparative example, and the ripples observed in FIG. 12 were significantly reduced as in the example 1.

Example 3

An optical modulator shown in FIGS. 1, 2, and 10 was produced as the comparative example was. However the pattern of the electrodes and gaps was changed to that shown in FIG. 10, which is different from the comparative example. Moreover, the respective parameters were set as:

| | |
|---|---|
| Substrate thickness: | 8 μm |
| Electrode thickness: | 25 μm |
| Electrode length: | 40 mm |
| $G_{11}$: | 55 μm |
| $G_{12}$: | 55 μm |
| $G_{21}$: | 45 μm |
| $G_{22}$: | 45 μm |
| $G_{31}$: | 20 μm |
| $G_{32}$: | 95 μm |
| $W_1$: | 60 μm |
| $W_2$: | 60 μm |
| $W_3$: | 30 μm |
| Maximum taper angle of tapered portion 11 b: | 30° |

The $S_{21}$ characteristic of the modulator was measured as in the comparative example, and the ripples observed in FIG. 12 were significantly reduced as in the example 1.

Example 4

An optical modulator shown in FIGS. 1, 2, and 11 was produced as the comparative example was. However the pattern of the electrodes and gaps was changed to that shown in FIG. 11, which is different from the comparative example. Moreover, the respective parameters were set as:

| | |
|---|---|
| Substrate thickness: | 8 μm |
| Electrode thickness: | 25 μm |
| Electrode length: | 40 mm |
| $G_{11}$: | 55 μm |
| $G_{12}$: | 55 μm |
| $G_{21}$: | 45 μm |
| $G_{22}$: | 45 μm |
| $G_{31}$: | 20 μm |
| $G_{32}$: | 95 μm |
| $G_{41}$: | 35 μm |
| $G_{42}$: | 70 μm |
| $W_1$: | 60 μm |
| $W_2$: | 60 μm |
| $W_3$: | 30 μm |
| $W_4$: | 45 μm |
| Maximum taper angle: | 30° |

The $S_{21}$ characteristic of the modulator was measured as in the comparative example, and the ripples observed in FIG. 12 were significantly reduced as in the example 1.

The specific embodiments of the present invention have been described, and the present invention is not limited to these specific embodiments, and may be changed and modified in various manners without departing from the scope of the claims.

The invention claimed is:

1. An optical waveguide device comprising:
a substrate comprising an electro-optical material;
an optical waveguide formed in or on the substrate and comprising at least a first branch and a second branch;
a signal electrode;
a first ground electrode; and
a second ground electrode,
wherein a voltage is applied on said first branch by means of said first ground electrode and said signal electrode,
a voltage is applied on said second branch by means of said second ground electrode and said signal electrode,
a first gap is formed between said first ground electrode and said signal electrode,
a second gap is formed between said second ground electrode and said signal electrode,
each of the first gap and the second gap is respectively divided into a voltage applying portion, a feed-through portion, and a connection portion therebetween, and
the first gap and the second gap satisfy the following formula:

$$G_{12}/G_{11} \leq G_{22}/G_{21} < G_{32}/G_{31}$$

where $G_{11}$ represents a width of the first gap at the connection portion, $G_{12}$ represents a width of the second gap at the connection portion, $G_{21}$ represents a width of the first gap at an end nearer to the connection portion of the voltage applying portion, $G_{22}$ represents a width of the second gap at an end nearer to the connection portion of the voltage applying portion, $G_{31}$ represents a width of the first gap at the voltage applying portion, and $G_{32}$ represents a width of the second gap at the voltage applying portion, and
wherein said first ground electrode and said second ground electrode are positioned to extend along and oppose said signal electrode along the entire length of said voltage applying portion.

2. The device of claim 1, wherein said first branch is located in the first gap and said second branch is located in the second gap.

3. The device of claim 1, wherein $G_{12}/G_{11}$ is 1.

4. The device of claim 1, wherein the device comprises a traveling wave optical modulator.

5. The device of claim 4, wherein the device can be used as a chirp modulator.

* * * * *